(12) United States Patent
Tan et al.

(10) Patent No.: US 7,924,525 B1
(45) Date of Patent: Apr. 12, 2011

(54) HYBRID TERMINATION OF TRANSMISSION LINE FOR DRIVING HARD DISK DRIVE HEAD

(75) Inventors: Kien Beng Tan, Singapore (MY); Xiao Yu Miao, Singapore (CN)

(73) Assignee: Marvell International Ltd., Hamilton (BM)

( * ) Notice: Subject to any disclaimer, the term of this patent is extended or adjusted under 35 U.S.C. 154(b) by 386 days.

(21) Appl. No.: 12/152,644

(22) Filed: May 14, 2008

Related U.S. Application Data

(60) Provisional application No. 60/938,479, filed on May 17, 2007.

(51) Int. Cl.
*G11B 17/00* (2006.01)
(52) U.S. Cl. .......................................................... 360/69
(58) Field of Classification Search .................... 360/69, 360/137
See application file for complete search history.

(56) References Cited

U.S. PATENT DOCUMENTS

| | | | | |
|---|---|---|---|---|
| 2,718,157 | A * | 9/1955 | Hall | 477/37 |
| 3,350,628 | A * | 10/1967 | Gallaher et al. | 323/285 |
| 3,510,577 | A * | 5/1970 | Amass | 360/73.05 |
| 3,546,974 | A * | 12/1970 | Schaefer et al. | 477/139 |
| 4,685,039 | A * | 8/1987 | Inou et al. | 363/16 |
| 5,023,768 | A * | 6/1991 | Collier | 363/68 |
| 5,825,850 | A * | 10/1998 | Bren et al. | 379/27.02 |
| 6,429,678 | B1 * | 8/2002 | Wong et al. | 326/30 |
| 2008/0129348 | A1 * | 6/2008 | Shau | 327/108 |

* cited by examiner

*Primary Examiner* — Fred Tzeng

(57) ABSTRACT

Drive circuitry for driving a load through a connection to a transmission line, such as for driving the write head of a hard disk drive. A hybrid termination is provided for termination at the connection to the transmission line. The termination is hybrid since there is both an in-series and an in-parallel component to the termination resistance. In addition, in embodiments where there is matched termination of the transmission line during a boost period of driving the load, the termination is hybrid since the termination is switched between a boost period of a write operation, and a steady state period of the write operation.

21 Claims, 12 Drawing Sheets

HYBRID TERMINATION OF TRANSMISSION LINE FOR DRIVING HARD DISK DRIVE HEAD

CROSS-REFERENCE TO RELATED APPLICATION

This application claims the benefit of U.S. Provisional Patent Application No. 60/938,479, filed May 17, 2007, the contents of which are hereby incorporated by reference as if fully stated herein.

FIELD

The present disclosure relates generally to electrical circuits, and more particularly to circuit techniques for terminating a transmission line.

BACKGROUND

One of the challenges that confront the designers of hard disk drives is the matched termination of the transmission line that drives the magneto-resistive head of the hard disk drive. These transmission lines must carry sufficient power to set the magnetic state of the disk surface, and thus must carry large amounts of current. Typical currents are from 10 mA to 60 mA during a steady-state period of driving the head, and 100 mA or more (such as 120 mA) during a boost period of driving the head. In addition, this current must be switched at high frequencies, typically several hundreds of megahertz to several gigahertz, so as to maintain high bit density at the disk surface.

FIGS. 1 and 2 illustrate this situation. FIG. 1 shows drive circuitry 10 for driving a load 11 through a transmission line 12. Drive circuitry 10 is connected to transmission line 12 through a connection 13, which might be composed of a pad or a terminal. In accordance with an input signal 14, drive circuitry 10 drives load 11 through transmission line 12, so as to result in a current $I_L$ flowing in the load 11.

FIG. 2 shows current $I_L$ at the load 11. As indicated at FIG. 2, the current $I_L$ has a positive-going portion and a negative-going portion, corresponding to ONE and ZERO bit states on the surface of the disk. The current $I_L$ has a boost portion $T_{BOOST}$ (or boost period) and a steady state portion $T_{STEADY\_STATE}$ (or steady state period). The boost portion is provided so as to achieve a high slew rate from the prior negative-going portion and the positive-going portion, and vice versa. The steady state portion is provided to effect proper magnetization of the surface of the disk.

Because the transmission line 12 has a characteristic impedance $Z_0$, the transmission line 12 stores transmitted current in the form of heat energy. If drive circuitry 10 is not properly terminated, it is possible for the transmission line 12 to release this stored heat energy, in the form of a reflected signal. More specifically, the far-end of the transmission line at load 11 is not matched by load 11 since the load needs large amounts of current. Thus, when the drive signal reaches the far-end of transmission line at load 11, some of the energy will be reflected back to the near-end 13 through the transmission line 12. If drive circuitry 10 is not properly terminated when the reflection wave comes back to the near-end 13, some of the reflection energy will be re-reflected to the far-end again, which will distort the signal at load 11. FIG. 2 shows a re-reflected signal represented by the dashed waveform. Re-reflected signals are disadvantageous since such signals affect the ability to change and maintain a desired magnetization state on the surface of the disk. Indeed, if reflections are sufficiently large, it is possible to erroneously invert the magnetic state, thus resulting in an incorrect magnetization state.

Two types of termination are commonly employed: series termination and parallel termination. FIG. 3A shows an example of series termination. As seen in FIG. 3A, drive circuitry 10 includes a bipolar transistor 15, which drives transmission line 12 through a series-connected termination resistor 16. The value of termination resistor 16 is selected so as to match the impedance $Z_0$ of transmission line 12. In a typical value, the impedance $Z_0$ of transmission line 12 is $Z_0=50\Omega$, and thus $R_T = Z_0 = 50\Omega$.

The arrangement shown in FIG. 3A has its disadvantages. Primary among these disadvantages is the voltage drop caused by termination resistor 16. Specifically, during the steady state period of operation, there might be 60 mA of current driving load 11. Thus, the voltage drop across termination resistor 16 is $V=60\,mA \times 50\Omega=3\,V$. Such a large voltage drop detracts from the ability of the arrangement of FIG. 3A to drive load 11 at high slew rates. At the same time, such a large voltage drop will make the drive voltage at near-end of the transmission line small and slow, which will eventually result in slower rise/fall times for the current at the driven head. Moreover, in portable applications where the available drive voltage is very small, the arrangement of FIG. 3A might not be able to provide sufficient current to effect changes in magnetization. As one example, many mobile applications have only +3/−2 V as supply voltages. A voltage drop as large as 3 V would make the implementation impossible for such mobile applications. As further examples, a 3.5 inch hard disk drive has +5V/−5V supply voltages for desktop/enterprise uses, a 2.5 inch hard disk drive has +5V/−3V supply voltages for laptop/mobile uses, and a 1.8 inch hard disk drive has +3.3V/−2.1V supply voltages for consumer/mobile uses. A voltage drop as large as 3 V would make these implementations difficult or impossible.

To address this disadvantage, series-terminated arrangements often include a current source such as current source 17. The provision of current source 17 ensures that there is sufficient current to drive load 11 through the transmission line, at the cost of added complexity to the drive circuitry 10.

FIG. 3B shows an example of parallel termination of a transmission line. Unlike in series terminated arrangements, a voltage drop across a termination resistor does not occur in parallel termination of a transmission line. However, parallel termination has its own disadvantages. Specifically, as shown in FIG. 3B, drive circuitry 10 is terminated by termination resistor 18 which is arranged in parallel across transmission line 12. As before, the value of termination resistor 18 is chosen so as to match the impedance $Z_0$ of transmission line 12. Switches 19 and 20 are respectively provided for driving current through load 11 during the boost period and the steady state period. A current mirror 21 sets the amount of current flowing during the steady state period. A positive-going cycle commences with the closure of both of switches 19 and 20. Both switches 19, 20 remain closed during the boost period. After the end of the boost period, switch 19 is opened and switch 20 remains closed for the duration of the steady state period.

One disadvantage with parallel termination as shown in FIG. 3B is that the termination resistance effectively changes between the boost period and the steady state period. During the boost period, because switch 19 is closed, the transistors forming current mirror 21 no longer operate in saturation mode. There is therefore some parasitic capacitance, $C_{PARASITIC}$, which changes the effective termination resistance of drive circuitry 10. This parasitic capacitance is effectively eliminated when switch 19 is opened, since transistors in current mirror 21 thereupon operate in saturation mode. Thus, the effective termination for drive circuitry 10 changes as between the boost period and the steady state period. Such a change in parasitic capacitance actually promotes signal reflections that matched termination is designed to avoid.

SUMMARY

These disadvantages are addressed through the provision of drive circuitry for driving a load through a transmission line in which the drive circuitry has a hybrid termination. In one aspect, the termination is "hybrid" in the sense that there is both a series termination and a parallel termination.

In one aspect, drive circuitry drives a load through a transmission line via a connection to the transmission line, such as drive circuitry that drives the magneto-resistive head of a hard disk drive through a transmission line. A steady state supply resistor is connected in series with a steady state supply switch, between a power source and the connection to the transmission line. The value of the steady state supply resistor determines a targeted steady state current delivered to the load during the steady state period. A steady state termination resistor is connected in parallel with a steady state termination switch across the connection. The value of the steady state termination resistor, together with the value of the steady state supply resistor, provides an impedance match to that of the transmission line. A boost supply switch is connected in series between the power source and the connection. A switch controller is configured to close the boost supply switch during a boosted period of driving the load, and thereafter to open the boost supply switch during a steady state period of driving the load. During the steady state period, the steady state supply switch and the steady state termination switches are both controlled to be closed.

By virtue of the foregoing, it is ordinarily possible to obtain an advantageous effect, wherein a targeted current is delivered to the load during a steady state period, and wherein the transmission line is terminated by a combination of an in-parallel resistor and an in-series resistor. In addition, termination of the transmission line is switched as between the steady state period and the boost period, which operates to terminate the transmission line with a matched impedance during the steady state period, and to reduce the effect of reflections of the drive signal from the transmission line.

In a further aspect, resistors and switches may be provided so as to obtain a targeted current during the boost period, and so as to provide matched termination during the boost period. According to this aspect, a boost supply resistor is connected in series with the boost supply switch, and a boost termination resistor is connected in parallel with a boost termination switch across the connection. The switch controller is configured to close the boost supply switch and the boost termination switch during the boost period. The value of the boost supply resistor determines a targeted boost current delivered to the load during the boost period, and the value of the boost termination resistor, together with the value of the boost supply resistor, provides an impedance match to that of the transmission line during the boost period.

Termination of the transmission line during the boost period provides an advantageous effect that is beneficial at high data rates or with lengthy boost periods. If implemented, this aspect of termination during the boost period also attaches a second meaning to the word "hybrid". According to this second meaning, the termination is "hybrid" since the termination is actively switched as between the boost period and the steady state period. According to the advantageous effect, termination of the transmission line during the boost period may be beneficial when the data rate is very high (such as at or above 1.2 Gbps), or when the boost period is longer than 2×Td (where Td indicates the delay time of the transmission line).

In other aspects, the load is driven differentially through a pair of transmission lines, and mirror image circuitry is provided for each of the transmission lines, with the switches acting in coordination with each other. Additionally, a positive-going and negative-going pair of circuits may be provided, so as to provide positive-going and negative-going current to the load, each with a boost period and a steady state period.

Methods of use and operation of such drive circuitry are also included within the scope of this disclosure.

A more complete understanding of this disclosure can be obtained by reference to the following detailed description and to the attached drawings.

DETAILED DESCRIPTION

First Embodiment

Figure 1:
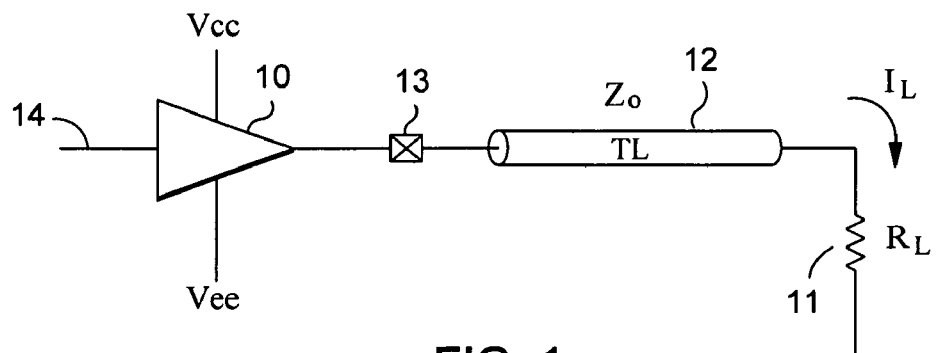
FIG. 1 is a representational schematic diagram showing conventional drive circuitry for driving a load through a transmission line.
Figure 2:
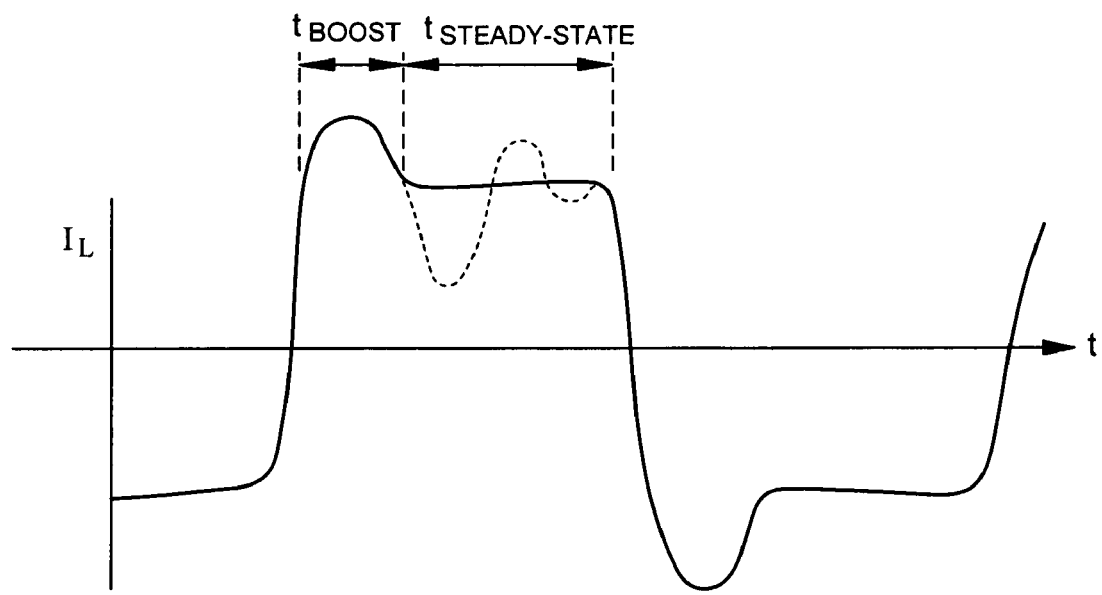
FIG. 2 is a waveform showing current delivered to a load and reflectances caused by improper termination.
Figure 3A:
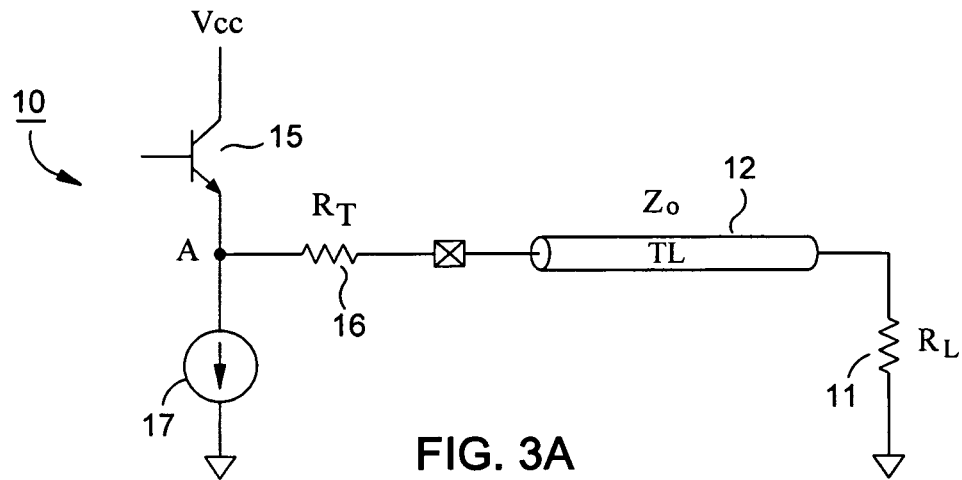
FIGS. 3A and 3B are conventional arrangements showing series termination and parallel termination, respectively, of a load driven through a transmission line.
Figure 3B:
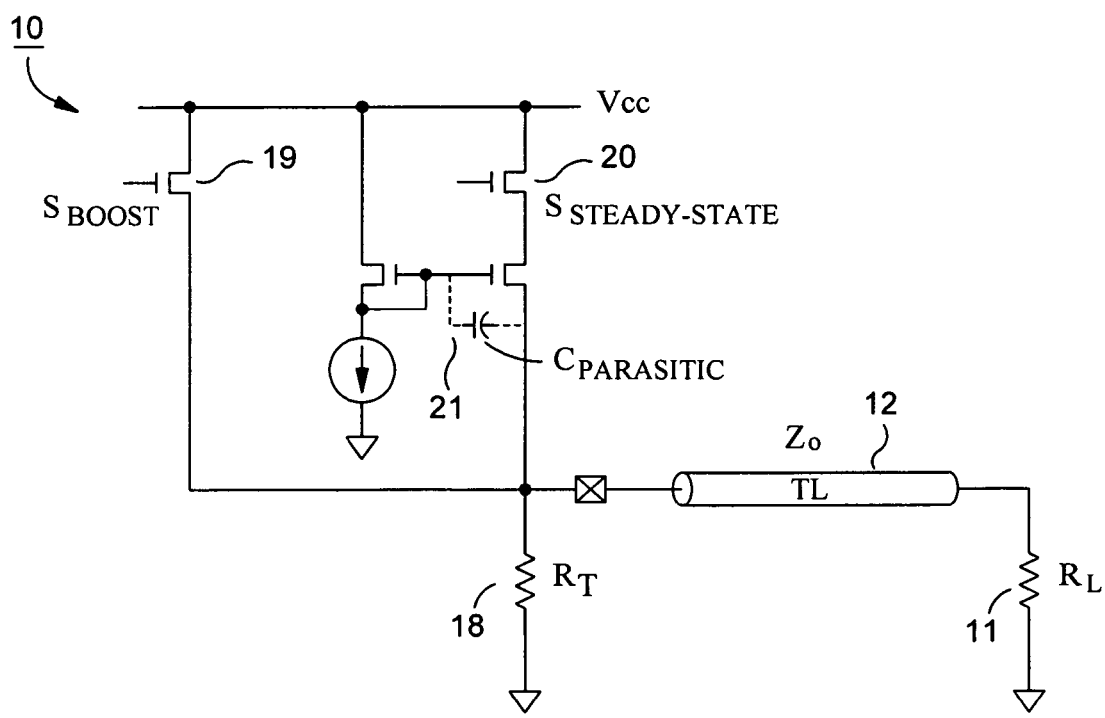
Figure 4:
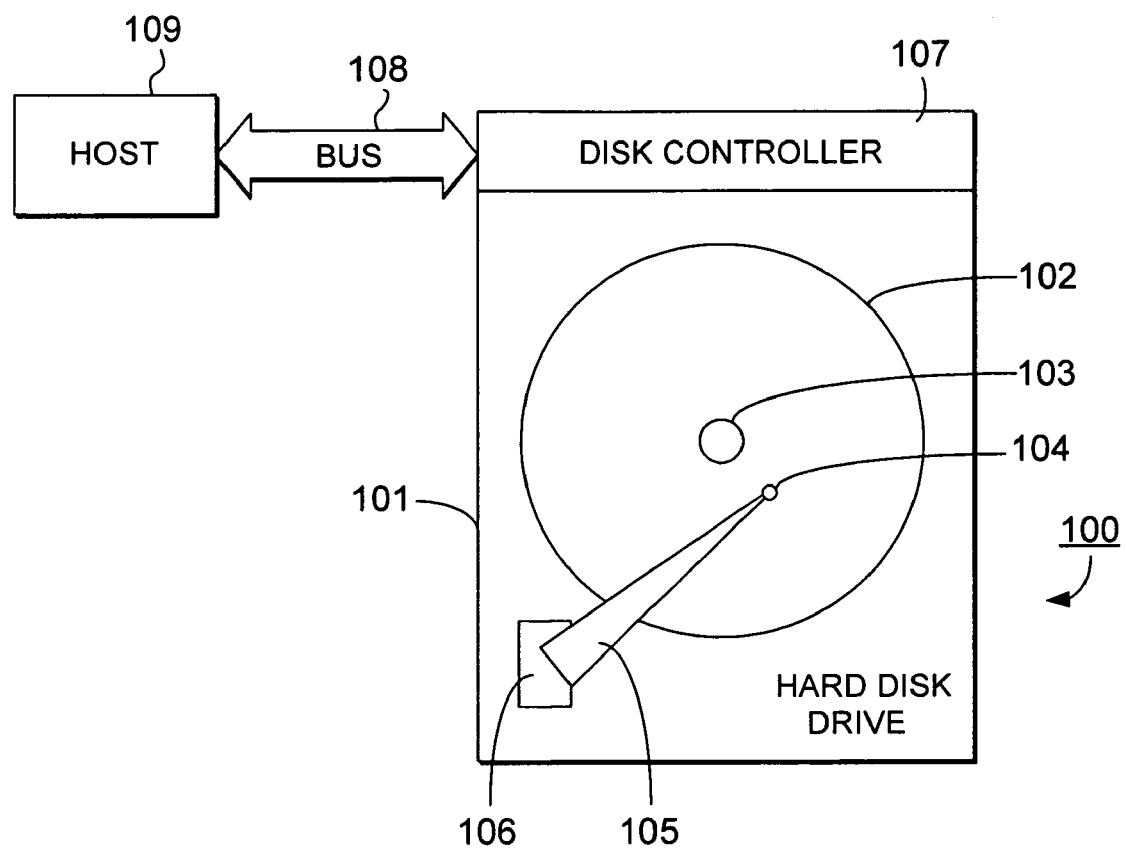
FIG. 4 is a representational view of a hard disk drive according to an example embodiment.

FIG. 4 is a representational view of a hard disk drive 100 according to an example embodiment. Mechanically, hard disk drive 100 includes housing 101 which houses physical storage medium 12. In one implementation, storage medium 12 is a platter coated with a magnetic material and rotatable about spindle 103 by a drive motor (not shown). A read/write head 104 is mounted to arm 105 for movement of the read/write head across the surface of medium 102 under control of actuator 106.

Hard disk drive 100 further includes disk controller 107 which generally includes a processor such as a digital signal processor, a microprocessor, a microcontroller or the like, for execution of instructions stored in memory for electrical and mechanical control of the hard disk drive components, and for electrical and mechanical control of hard disk drive circuitry. Disk controller 107 includes an interface via bus 108 to a host 109. Host 109 might be a personal computer such as a laptop or desktop, or host 109 can be an embedded device such as a hand-held PDA or music player. Other examples of host 109 are given in connection with FIGS. 8A through 8H, below.

Bus 108 can be an EIDE interface, an ATA or serial ATA (SATA) interface, a fiber channel (FC), or a serial attached SCSI (SAS) interface, although it will be understood that other buses and other interfaces might be used.

Disk controller 107 includes drive circuitry, described herein below, for driving read/write head 104 through a transmission line during a write operation. Details of the drive circuitry are shown below in connection with FIG. 6A. Before turning to' FIG. 6A, a description will first be made for one technique for deriving the values of resistances used in the drive circuit.

Figure 5:
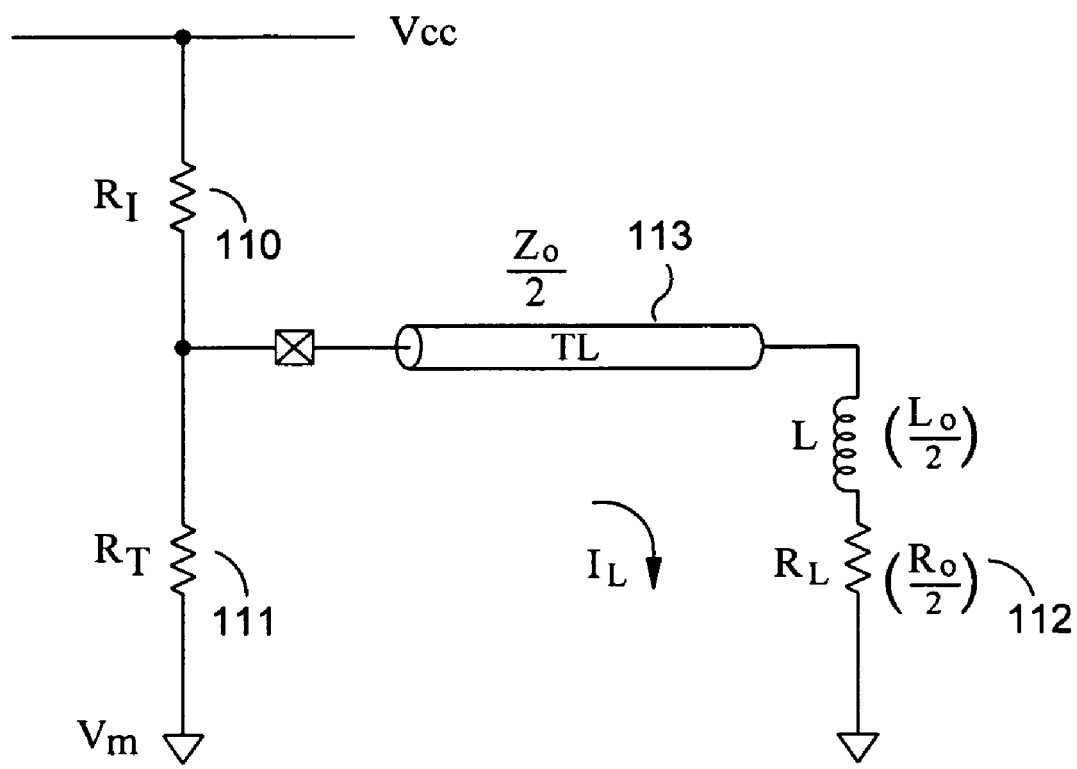
FIG. 5 is a conceptual schematic diagram for explaining one technique for deriving suitable values for supply and termination resistances.

FIG. 5 is a conceptual schematic diagram showing a supply resistor 110 and a termination resistor 111 driving a load 112 through transmission line 113. FIG. 5 is conceptual in the sense that FIG. 5 shows one portion of actual drive circuitry during one brief moment in time of opened and closed switches, all of which are unshown for purposes of clarity of explanation. As can be understood from FIG. 5, magneto resistive head 104 is being modeled as an inductor L in series with a resistor $R_L$. The value of inductor L is $L_0/2$, and the value of load resistance $R_L$ is $R_0/2$.

From application of Ohm's Law, the current $I_L$ through the load resistor $R_L$ can be obtained by the following equation (1). Note that this equation (1) is accurate during periods where the supply of current is relatively constant. During a relatively short boost period (such as a boost period whose duration is smaller than around 2×Td) or during short transition periods, the equation is no longer completely accurate because of the effect of the transmission line.

$$I_L = \frac{V_{cc} - V_m}{R_I + R_0/2} \qquad (1)$$

In addition, for impedance matching to the impedance of transmission line 113, which has a value of $Z_0/2$, the following equation (2) applies:

$$R_I \| R_T = \frac{Z_0}{2} \qquad (2)$$

It is therefore possible to solve these two equations so as to obtain an appropriate value for supply resistor 110 in order to supply a targeted current $I_L$ to load resistor 112, and so as to obtain an appropriate value for termination resistor 111 for impedance matching to the impedance of transmission line 113. In particular, the following equations (3) and (4) are obtained:

$$R_I = \frac{V_{cc} - V_m}{I_L} - \frac{R_0}{2} \qquad (3)$$

$$R_T = \frac{R_I \cdot Z_0/2}{R_I - Z_0/2} \qquad (4)$$

Examples of the application of these equations (3) and (4) will now be provided. In a hard disk drive, the load resistance corresponds to the resistance of the write head which is typically very small, normally from around 2Ω to around 5Ω, with an inductance of a few nano-Henrys. In this example, it is assumed that the load resistance $R_L=4\Omega$. The impedance of transmission line 113 is assumed to be $Z_0/2=50\Omega$, and the mid-level voltage Vm is at or near ground level of Vm=0 V. Application of equations (3) and (4) using these example values yields the following values in Table 1 for supply resistor 110 and termination resistor 111 as a function of various full-swing supply voltages Vcc−Vee and targeted currents through load $R_L$.

TABLE 1

Example values of supply and termination resistors
$Z_0/2 = 50\ \Omega$
$R_L = R_0/2 = 4\ \Omega$

| Supply Voltage Vcc − Vee | Targeted Current $I_L$ (mA) | Supply resistor 110 $R_I$ (Ω) | Termination resistor 111 $R_T$ (Ω) |
|---|---|---|---|
| 10 V (+5 V/−5 V) | 10 | 996 | 53 |
| | 30 | 329 | 59 |
| | 60 | 163 | 72 |
| | 100 | 96 | 104 |
| | 120 | 79 | 135 |
| 8 V (+5 V/−3 V) | 10 | 796 | 53 |
| | 30 | 263 | 62 |
| | 60 | 129 | 82 |
| | 100 | 76 | 146 |
| | 120 | 63 | 247 |
| 5.4 V (+3.3 V/−2.1 V) | 10 | 536 | 55 |
| | 30 | 176 | 70 |
| | 60 | 89 | 119 |
| | 100 | 50 | ∞ |
| | 120 | 41 | ∞ |

In the above Table 1, values of infinity (∞) indicate situations where the supply resistor 110 already has a value that is smaller than that needed for matched termination with transmission line 113. More specifically, in some cases such as low data rate, low supply voltage, or short boost period, it might not be necessary, or it might not be possible, to match the transmission line during the boost period. For example, in a 1.8 inch hard drive, supply voltages are +3.3V/−2.1V. If the current during the steady-state period is 30 mA and the current during the boost period is 100 mA, then since Rload≈0, the needed value for supply resistor 110 is R=(3.3+2.1)/(100 mA+30 mA)=41Ω. If the transmission line has characteristic impedance of 50Ω, it is not possible to match the transmission line during the boost period in this case. That is why with a low power supply, it is very difficult to reach high data rate. To achieve higher data rates, it may be necessary to make the trace of the transmission line shorter or to lower the requirements for currents during the steady-state and boost periods. As another example, taken directly from Table 1 above, for situations in which the supply voltage Vcc−Vee=5.4 V and the targeted current $I_L$=120 mA, the supply resistor 110 has a value of $R_f$=41Ω. This value is needed in order to provide the targeted current of $I_L$=120 mA. It also results in a situation where the supply resistor 110 is already smaller than that needed for matching against the impedance of transmission line 113. Accordingly, in these situations, no termination resistor is provided, and the termination is left open. If any termination resistor were provided (rather than leaving an open circuit), then this would result in an undesirable lowering of the termination impedance for the drive circuit. Although this might be tolerable in some applications, it generally should be avoided.

As one further example, Equations (3) and (4) (or the above Table 1) are used to derive values for resistors in a situation where there is a boost period where the target current is 100 mA, followed by a steady state period where the target current is 60 mA. If the supply voltage Vcc−Vee=10 V, then during the boost period where the targeted current is 100 mA, then a supply resistor of $R_f$=96Ω is needed to supply the targeted current to the load, and a termination resistor of $R_T$=104Ω is needed for matched termination of transmission line 113. On the other hand, during the steady state period where the targeted current is 60 mA, then a supply resistor of $R_f$=163Ω is needed to supply the targeted current to the load, and a termination resistor of $R_T$=72Ω is needed to terminate transmission line 113 and match the impedance of transmission line 113.

Figure 6A:
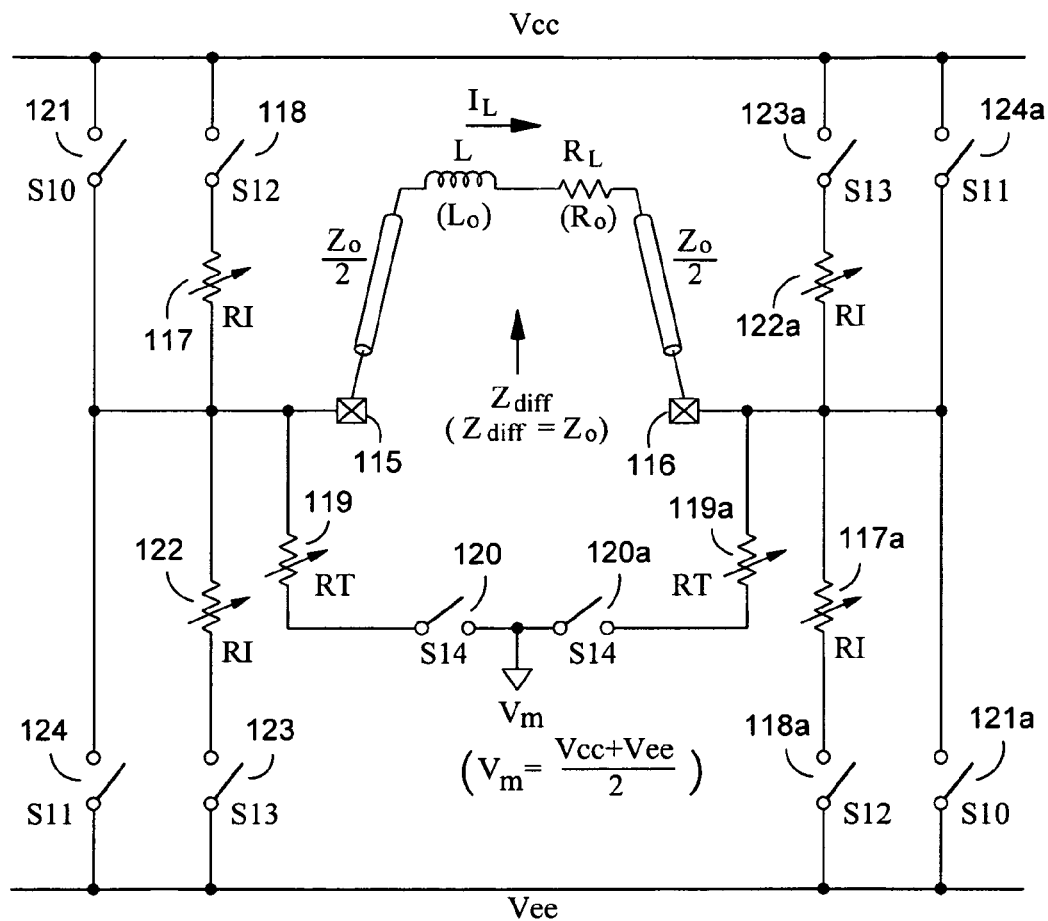
FIG. 6A is a detailed schematic circuit showing drive circuitry according to a first embodiment.

Use of these concepts, and values for resistances derived thereby, will now be described in connection with FIG. 6A, which shows a detailed schematic diagram of drive circuitry for driving a load through a transmission line. In FIG. 6A, the load corresponds to read/write head 104, and the write portion of read/write head 104 is modeled in FIG. 6A as an inductance L in series with a load resistor $R_L$. The load is driven differentially through a pair of transmission lines, each with impedance $Z_O/2$, so as to obtain a targeted current $I_L$ during each of a boost period and a steady state period.

The drive circuitry of FIG. 6A drives the load with a positive-going current and a negative-going current, wherein each of the positive-going current and the negative-going current includes a boost period and a steady state period. For this purpose, (in one implementation) the positive-going current is driven by a pair of mirror-image circuit elements that include switches S10 and S12, resistor $R_f$, resistors $R_T$, and switches S14. For the negative-going current, (in one implementation) the drive circuitry includes a pair of mirror-image circuit elements that include switches S11 and S13, supply resistor $R_f$, and (again) termination resistors $R_T$ and switches S14. These latter circuit elements are used commonly, for matched termination of the differential pair of transmission lines during both the positive-going current flow and the negative-going current flow.

A fuller description of the drive circuitry shown in FIG. 6A follows. The load is driven through a pair of connections 115 and 116, which may be connection pads or terminals, and which differentially connect to the transmission lines for driving the load. For the positive-going current, a steady state supply resistor 117 is connected in series with a steady state supply switch 118, between the Vcc positive power source and connection 115. A steady state termination resistor 119 is connected in parallel with a steady state termination switch 120 across the connection 115. A boost supply switch 121 is connected in series between the power source and connection 115. As previously mentioned, the load is driven differentially; thus there are mirror image switches and resistors that connect to connection 116, which include steady state supply resistor 117a, steady state supply switch 118a, steady state termination resistor 119a, steady state termination switch 120a and boost supply switch 121a. These circuit elements are fed from a negative power supply voltage Vee.

For the negative-going current, similar circuitry is provided. Thus, the negative-going current is provided via steady state supply resistors 122 and 122a, steady state supply switches 123 and 123a, and boost supply switches 124 and 124a. Termination resistors 119 and 119a, together with termination switches 120 and 120a, are used commonly for both the positive-going current and the negative-going current.

Operation of the drive circuitry shown in FIG. 6A is explained in connection with the timing diagram shown in FIG. 6B. In this timing diagram, mirror-image switches are actuated to open and close position in synchronism with each other. Thus, for example, both of boost supply switches 121 and 121a are closed at the same time, and both are opened at the same time. Accordingly, the waveforms of FIG. 6B will be explained in connection with reference numerals that designate the pair of mirror image switches. For the positive-going current, steady state supply switches 118 and 118a are referred to as switches S12, and the boost supply switches 121 and 121a are referred to as switches S10. Likewise, for the negative-going current, steady state supply switches 123 and 123a are referred to as switches S13, and boost supply switches 124 and 124a are referred to as switches S11.

Figure 6B:
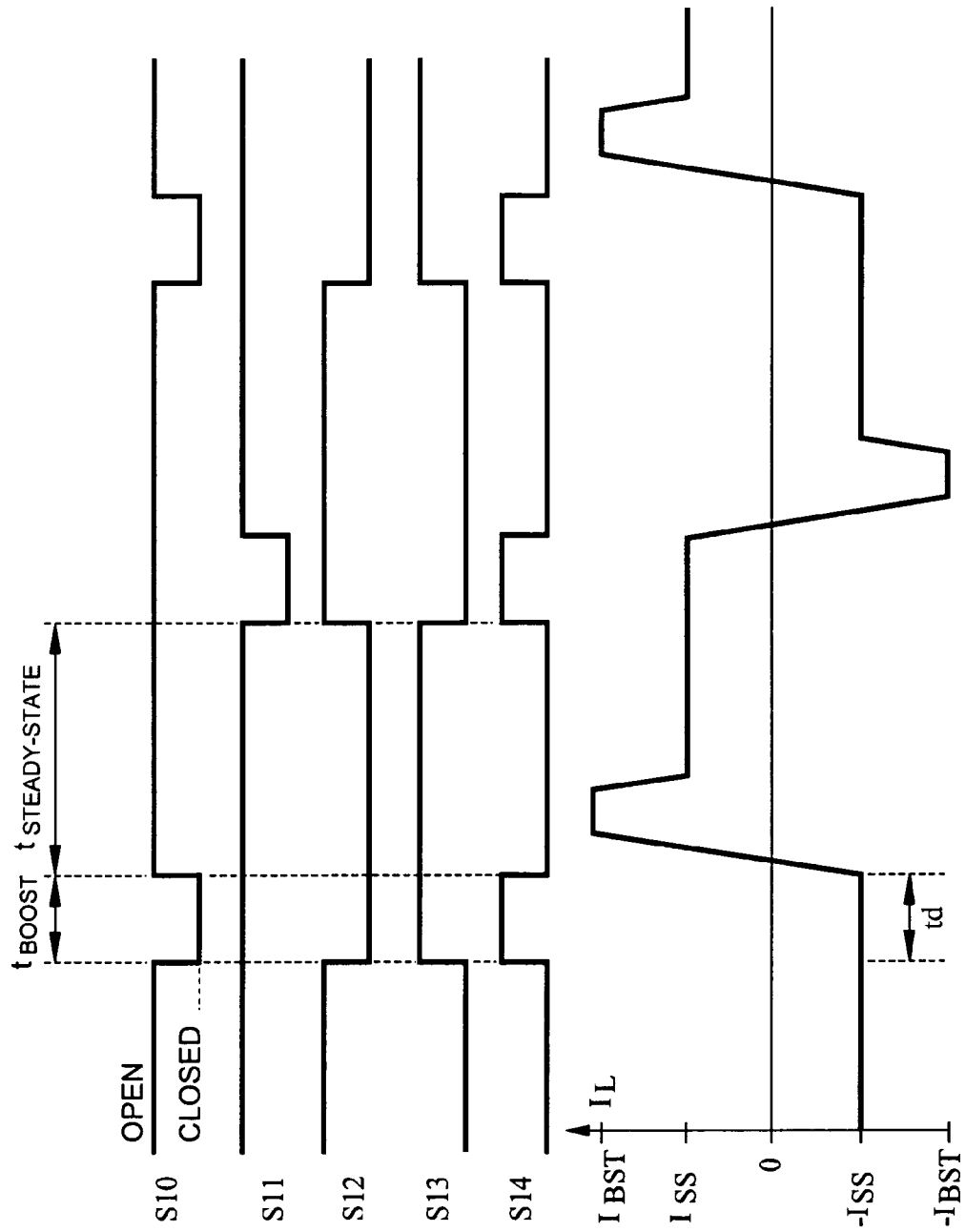
FIG. 6B shows a timing diagram for control of switches according to the first embodiment, together with a waveform showing current delivered to the load.

Referring to FIG. 6B, during the positive-going current flow, boost supply switches S10 are closed and steady state supply switches S12 are closed, and all other switches are opened. In this configuration, since the value of the load resistor $R_L$ is small, current through the load $I_L$ is limited primarily by (a) the characteristic impedance of the transmission line (Zo), (b) the initial current flowing through the load (Iss_0), and (c) the value of the supply voltage (Vlaunch). Assuming that the value of $R_L$ is small enough to be neglected, then Γ=(Zload−Zo)/(Zload+Zo)≈−1. The value of the current during the boost period is therefore equal to (Vlaunch/Zo)×(1−Γ)−Iss_0. (Note that Iss_0 has a negative sign since the current during the previous period always has a different direction.) Thus, current during the boost period is large, resulting in a high slew rate for the transition from a negative-going current to a positive-going current. It should be recognized, however, that despite the advantage of a high slew rate, the transmission lines are effectively terminated with a 0Ω resister. This results in an impedance mismatch between the output impedance of the drive circuitry and the input impedance of the transmission lines, which is disadvantageous as compared to other embodiments such as the second embodiment. Despite this disadvantage, however, there are situations in which a high slew rate provides significant advantages. Moreover, as will be appreciated shortly, the transmission line is terminated with matched impedance during the upcoming steady state period, and matched termination will result in significantly decreased signal reflections during the steady state period.

After completion of the boost period, the circuitry enters the steady state period in which boost switches S10 are opened and steady state termination switches S14 are closed. During the steady state period, current $I_L$ delivered to the load is limited by the steady state supply resistors 117 and 117a. In one example, the values for termination resistors 117 and 117a are chosen as explained above in connection with FIG. 5 and Table 1.

In addition, because steady state termination switches S14 are closed, the drive circuitry is terminated with a matched impedance relative to the differential impedance of the differential transmission lines. The values for steady state termination resistors 119 and 119a are chosen in as described above in connection with FIG. 5 and Table 1.

The waveform for current $I_L$ delivered to the load is depicted in FIG. 6B. As seen in FIG. 6B, after a time delay of $T_d$ (which corresponds to the delay of the transmission lines), the current $I_L$ delivered to the load undergoes a boosted period of increased current followed by a steady state period of nominal current.

After completion of the positive-going steady state period, the switches are controlled so as to enter a negative-going boost period. As seen in the control signals of FIG. 6B, negative-going boost supply switches S11 are closed, together with negative-going steady state supply switches S13. All other switches are opened. During this negative-going boost period, maximum negative current flows to the load. Thereafter, a negative-going steady state period is entered, in which steady state supply switches S13 remain closed, steady state termination switches S14 are closed, and all other switches are opened.

The drive circuitry depicted in FIG. 6A can be implemented using CMOS fabrication technology. All switches are can be implemented as NMOS or PMOS FETs, and all resistors likewise can be implemented on silicon. All switches are operated under control of a switch controller implemented in disk controller 107, which also provides the drive signal based on information being stored magnetically to the surface of medium 102.

In FIG. 6A, all resistors are shown as programmable resistors, and the values of these resistors can be programmed on-the-fly by operation of disk controller 107. It is therefore possible for disk controller 107 to compensate for changed environmental conditions for the disk (for example to achieve higher and/or load currents) or for effects of aging on the disk or disk components. In other embodiments, the resistors are not programmable, but rather are selected and fixed at design time as described above.

For example, in situations where it is desired to deliver a steady state current of 60 mA from positive and negative power supply voltages of Vcc=+5 V and Vee=−5 V, into transmission lines whose differential impedance is 50Ω so as to drive a load of 4Ω, then steady state supply resistances 117, 117a, 122 and 122a are all selected to have a value of 163Ω, whereas steady state termination resistors 119 and 119a are selected to have a value of 72Ω. These values are shown in the above Table 1.

Second Embodiment

Figure 7A:
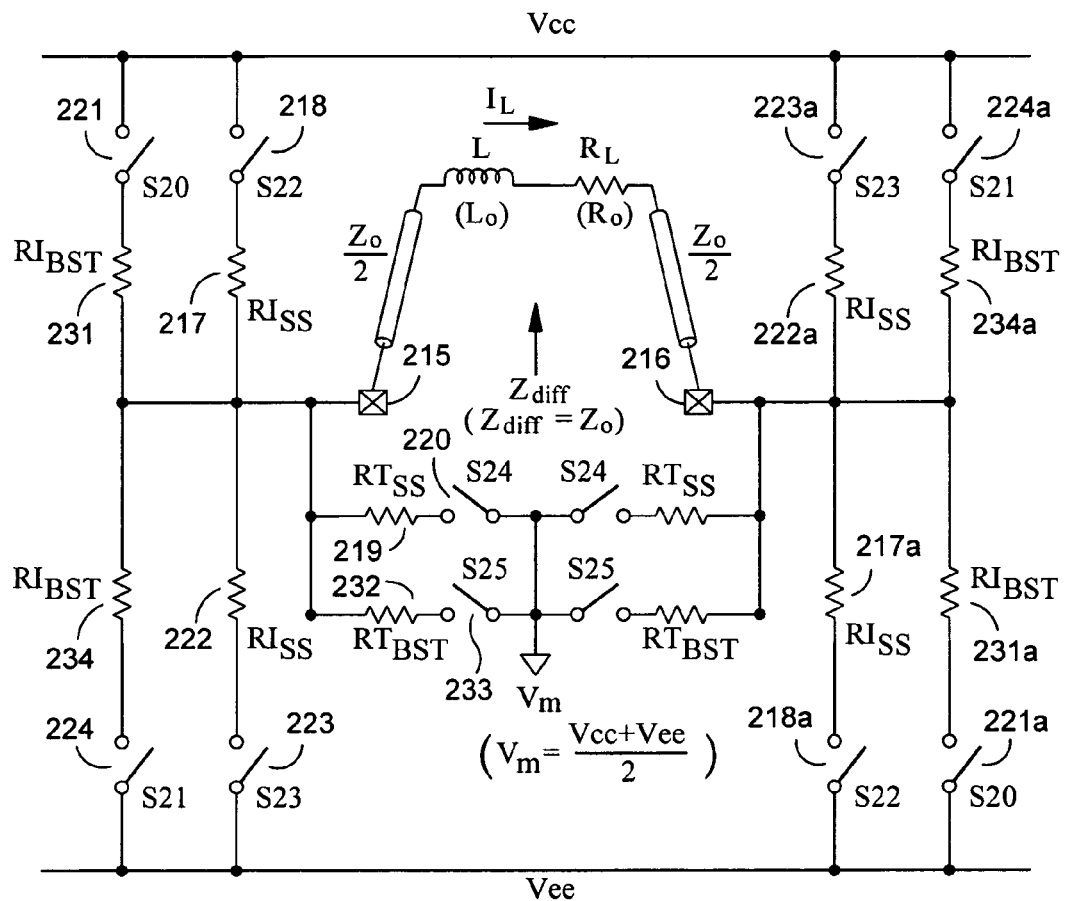
FIG. 7A is a detailed schematic diagram of drive circuitry according to a second embodiment.

FIG. 7A shows drive circuitry according to a second example embodiment. The drive circuitry of FIG. 7A can be provided in connection with a hard disk drive similar to hard disk drive 100 of FIG. 4.

One difference between the embodiment of FIG. 7A and that of FIG. 6A lies in the provision of boost supply resistors, which control the amount of current delivered to the load during the boost period, together with the provision of boost termination switches and resistors which provide an impedance match to the transmission lines during the boost period. The provision of resistors provides a further advantage in that no switch is connected directly to the transmission lines. This configuration is advantageous since the configuration ensures that parasitic capacitance of the switches, which often change during different conduction states of the transistors that form the switches, is isolated from the termination of the drive circuitry and thus does not affect termination during operation of the drive circuitry.

Termination of the transmission line during the boost period provides an advantageous effect that is beneficial at high data rates or with lengthy boost periods. More precisely, termination of the transmission line during the boost period may be beneficial when the data rate is very high (such as at or above 1.2 Gbps), or when the boost period is longer than 2×Td (where Td indicates the delay time of the transmission line). Td is dependent on trace length and the material used for 105 in FIG. 4. Td is typically from around 200 ps (picoseconds) to around 300 ps. At lower data rates and/or at shorter boost periods, the benefit of terminating the transmission line during the boost period may not be needed. For example, consider a situation in which Td=250 ps, Tboost=300 ps. In this situation, the first reflection from the load side to the driving side will arrive at the driving side in 2×Td=500 ps and will last around 300 ps. So, if the data rate is lower than around 1.25 Gbps (i.e., a data rate lower than 1/(500 ps+300 ps)), the reflection will arrive at the driving side when the driving is already in steady state, and will not be re-reflected back to the load side if at the steady state the driving side is perfectly terminated. Nevertheless, termination of the transmission line during the boost period provides an advantageous effect that is beneficial at high data rates or with lengthy boost periods, or in situations where termination during the steady-state period might not be perfect.

In more detail, the drive circuitry shown in FIG. 7A drives a load through a differential pair of transmission lines via a pair of connections 215 and 216 to the transmission lines. For positive-going current, mirror image circuit elements are provided. These elements include a steady state supply resistor 217 connected in series with a steady state supply switch 218 between a power source Vcc and connection 215, together with a steady state termination resistor 219 connected in parallel with a steady state termination switch 220 across connection 215. In like manner, a boost supply resistor 231 is connected in series with a boost supply switch 221 between the voltage source Vcc and connection 215, and a boost termination resistor 232 is connected in parallel with a boost termination switch 233 across connection 215. The mirror image circuit elements are designated with like reference numerals suffixed with the letter "a", which are connected to connection 216 and powered by power source Vee.

For the negative-going current, mirror image elements are also provided. These elements include a steady state supply resistor 222 connected in series with a steady state supply switch 223 between power source Vee and connection 215, together with a boost supply resistor 234 connected in series with a boost supply switch 224, also between the power source Vee and connection 215. The termination resistors 219 and 232 and termination switches 220 and 233 are used in common with both the positive-going circuit elements and the negative-going circuit elements. Mirror image elements are designated with like reference numerals, using the suffix "a", which are connected to connection 216 and powered by power source Vcc.

Values for the resistors shown in FIG. 7A are shown as fixed, but in other example embodiments, the values can be programmable from disk controller 107, as in the first embodiment.

Selection of suitable values for the resistors depends in part upon the timing for actuation of the switches to open and closed positions, since the positions of the switches determines whether the resistors are connected individually or in parallel with each other. Accordingly, operation of the switches will be explained with reference to the timing diagram shown in FIG. 7B.

Figure 7B:
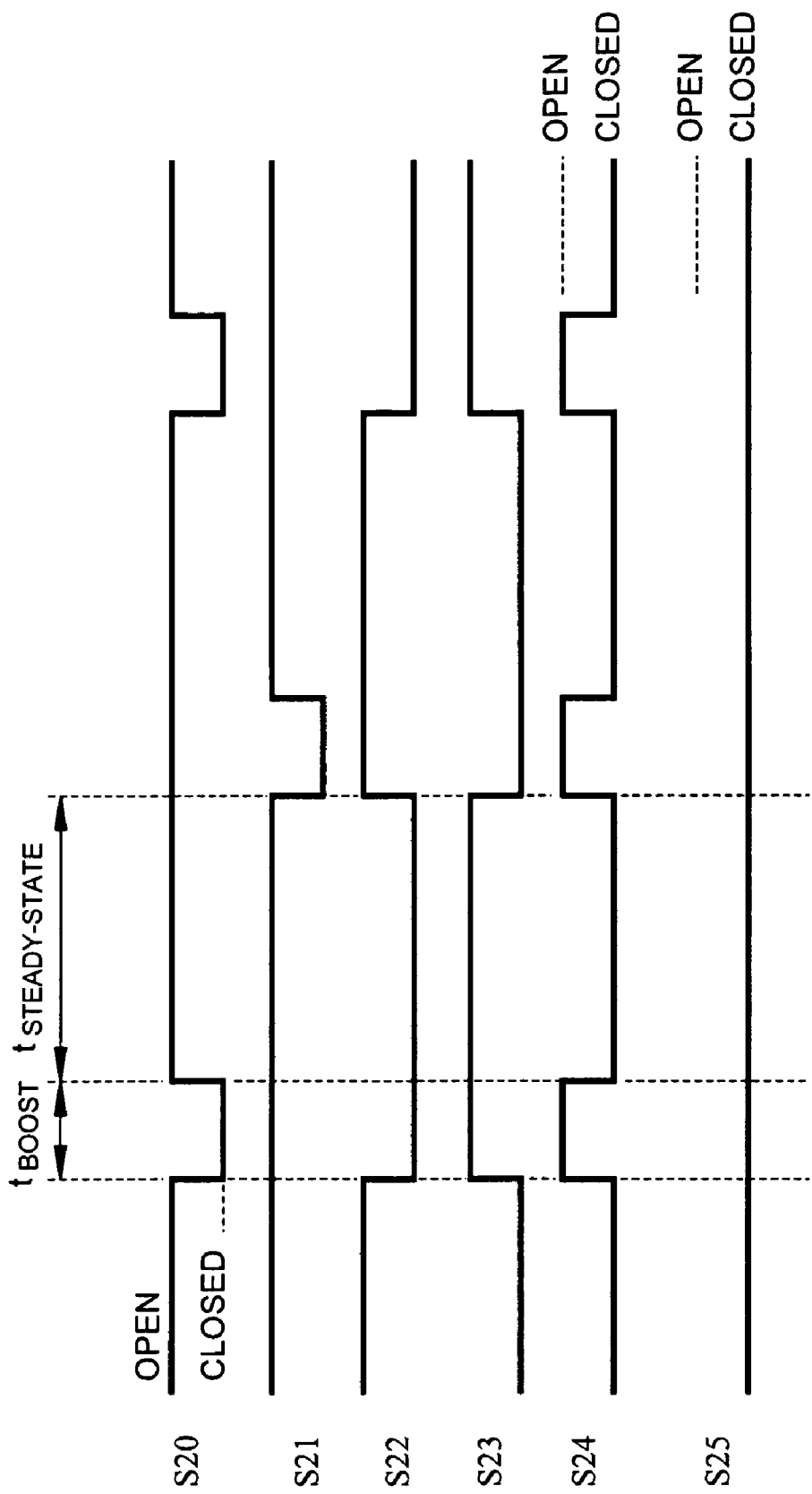
FIG. 7B shows a timing diagram for control of switches according to the second embodiment.

As shown in FIG. 7B, during a positive-going boost period, boost supply switches 221 and 221a are closed, as shown in the waveform for switches S20. In addition, boost termination switches 233 and 233a are also closed, as shown at the waveforms for switches S25. Finally, steady state supply switches 218 and 218a are closed, as shown in the waveform for switches S22. All other switches are open.

By virtue of this configuration of switch actuations (i.e., openings and closings), it will be appreciated that the supply resistors 217 and 231 for both boost and steady state are connected in parallel, and that the boost termination resistor 232 acts alone. Accordingly, the following equation (5) defines the relationship for achieving a target current for the boost period. As in the first embodiment, this equation (5) is accurate during periods where the supply of current is relatively constant. During a relatively short boost period (such as a boost period whose duration is smaller than around 2×Td) or during short transition periods, the equation is no longer completely accurate because of the effect of the transmission line. However, for relatively longer boost periods, equation (5) is sufficiently accurate.

$$I_{L(BOOST)} = \frac{V_{cc} - V_{ee}}{2 \cdot (RI_{BST} \| RI_{SS}) + R_L} \quad (5)$$

For relatively short boost periods, or where there are other high-speed transitions on a transmission line, the following equations (6a) through (6c) define the relationship for achieving a target current for the boost period.

$$I_{L(BOOST)} = I_{LAUNCH} \times (1.0 - \Gamma) \quad (6a)$$

where $\Gamma$ is the reflection coefficient at the load side of the transmission line:

$$\Gamma = \frac{Z_{LOAD} - Z_0}{Z_{LOAD} + Z_0} \quad (6b)$$

and where $I_{LAUNCH}$ is the current needed at the drive-side of the transmission line to impress the target current through the load:

$$I_{LAUNCH} = V_{LAUNCH}/Z_0 \quad (6c)$$

The following equation (7) defines the relationship for achieving matched termination of the driver circuitry for driving the transmission lines during the boost period:

$$RI_{BST} \| RI_{SS} \| RT_{BST} = Z_0/2 \quad (7)$$

There are more unknowns than equations, and thus the exact values of the resistances cannot be determined until the steady state period has also been considered. As shown in the waveforms of FIG. 7B, during the steady state period, the boost supply switches 221 and 221a are opened as shown at the waveform for switches S20, the steady state supply switches 218 and 218a remain closed as shown in the waveform for switches S22, the steady state termination switches 220 and 220a are closed as shown at the waveform for switches S24, and the boost termination switches 233 and 233a remain closed as shown at the waveforms for switches S25.

As a consequence of these switch actuations, it will be appreciated that during the steady state period, the steady state supply resistors 217 and 217a are connected individually, whereas the steady state termination resistors 219 and boost termination resistors 232 are connected in parallel.

Accordingly, assuming a relatively long steady state period during which Ohm's Law applies, the following equations (8) and (9) define the relationship for achieving a target current for the steady state period, as well as for achieving matched termination of the driver circuitry for driving the transmission lines during the steady state period:

$$I_{L(STEADY\_STATE)} = \frac{V_{cc} - V_{ee}}{2RI_{SS} + R_L} \quad (8)$$

$$RI_{SS} \| RT_{BST} \| RT_{SS} = Z_0/2 \quad (9)$$

There are now enough equations to determine the four unknowns, and these equations can be solved to determine suitable values for the supply resistors for both boost and steady state, and the termination resistors for both boost and steady state.

In one example embodiment, the target value for boost current is 100 mA, and the target value for steady state current is 60 mA. Supply voltages are Vcc=+5 V and Vee=−5 V. Load resistance $R_L$=4Ω, and impedance of each transmission line is $Z_0/2$=50Ω. Using the foregoing equations (5) through (8), the following values are calculated: $RI_{BST}$=225Ω, $RI_{SS}$=180Ω, $RT_{SS}$=223Ω, $RT_{BST}$=100Ω.

Other example embodiments may alter the precise timings of the openings and closings of switches S20, S21, S22, S23, S24 and S25, and may alter the coordination between the periods when some switches are opened and other switches are closed. For example, although in this second embodiment both of switches S20 and S22 are closed during the boost period, it is possible to close only the boost supply switches S20 during the boost period, with steady state supply switches S22 remaining open until commencement of the steady state period when steady state supply switches S22 are closed and boost supply switches S20 are opened. Such modifications will naturally affect the precise nature of equations (5) through (8), which should be modified based on which resistors are in parallel, which are in series, and which are switched out of the circuitry, during each period of switch actuation. Moreover, based on the nature of the embodiment, there might be situations where one or more switches are always closed or always open. In the second embodiment, for example, boost termination switch S25 is always closed. For such situations, always-closed switches may be replaced by hard-wired connections, and always-open switches need not be fabricated at all.

Other Embodiments

Figure 8A:
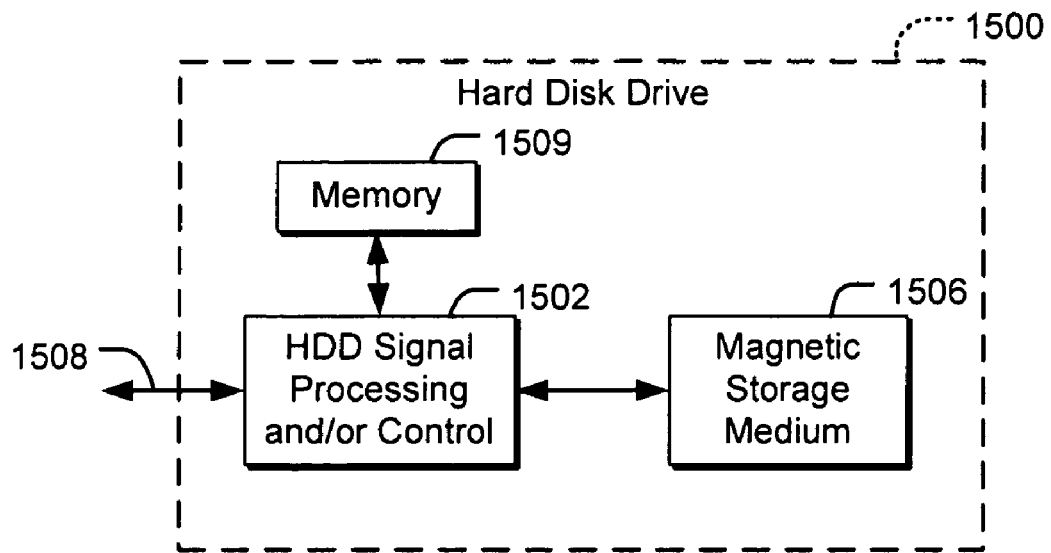
FIG. 8A is a block diagram showing an example embodiment in a hard disk drive (HDD).

Referring now to FIGS. 8A through 8H, various example embodiments of the present invention are shown. Referring to FIG. 8A, the present invention may be embodied as a disk drive or disk drive controller, in a hard disk drive (HDD) 1500. The present invention may implement either or both signal processing and/or control circuits, which are generally identified in FIG. 8A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 8B:
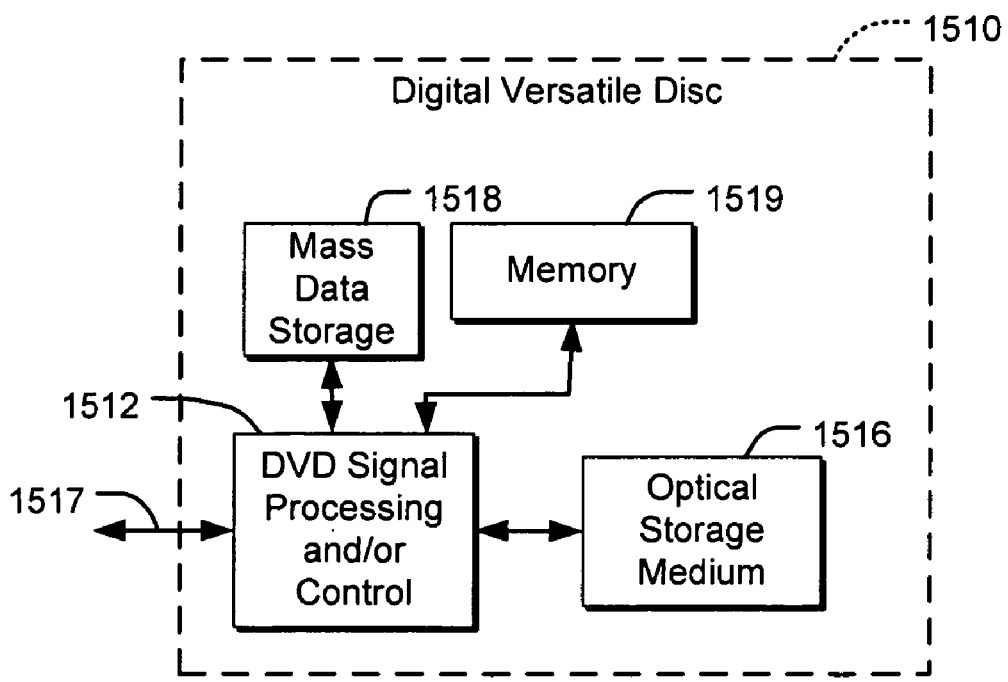
FIG. 8B is a block diagram of an example embodiment in a digital versatile disk (DVD) drive.

Referring now to FIG. 8B, the present invention may be embodied as a disk drive or disk drive controller, in a digital versatile disc (DVD) drive 1510. The present invention may implement either or both signal processing and/or control circuits, which are generally identified in FIG. 8B at 1512, and/or mass data storage 1518 of DVD drive 1510. Signal processing and/or control circuit 1512 and/or other circuits (not shown) in DVD drive 1510 may process data, perform coding and/or encryption, perform calculations, and/or format data that is read from and/or data written to an optical storage medium 1516. In some implementations, signal processing and/or control circuit 1512 and/or other circuits (not shown) in DVD drive 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD drive 1510 may communicate with mass data storage 1518 that stores data in a nonvolatile manner. Mass data storage 1518 may include a hard disk drive (HDD) such as that shown in FIG. 8A. The HDD may be a mini HDD that includes one or more platters having a diameter that is smaller than approximately 1.8". DVD drive 1510 may be connected to memory 1519, such as RAM, ROM, low latency nonvolatile memory such as flash memory, and/or other suitable electronic data storage.

Figure 8C:
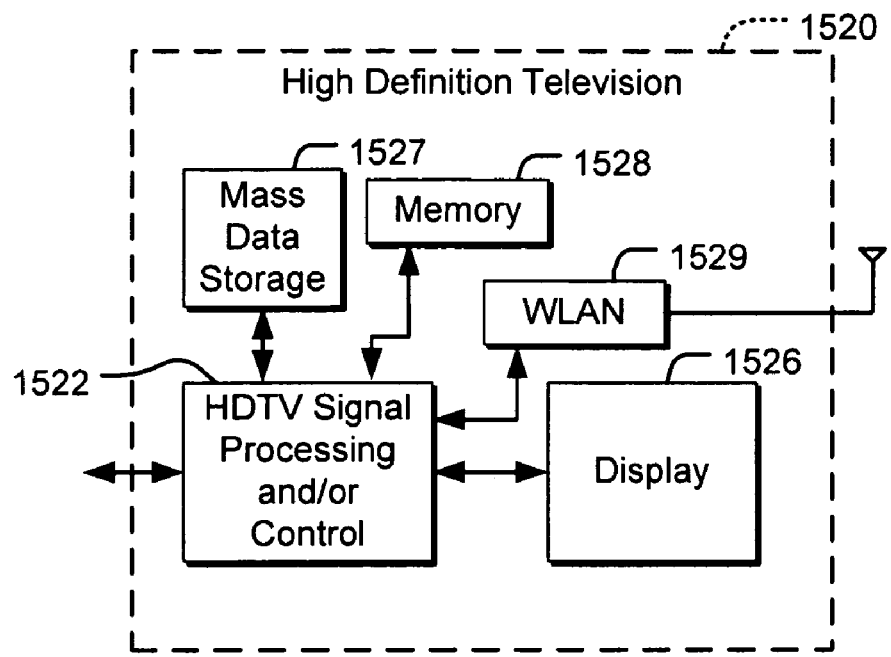
FIG. 8C is a block diagram of an example embodiment in a high definition television (HDTV).

Referring now to FIG. 8C, the present invention may be embodied as a disk drive or a disk drive controller, in a high definition television (HDTV) 1520. The present invention may implement either or both signal processing and/or control circuits, which are generally identified in FIG. 8C at 1522, a WLAN interface and/or mass data storage of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices, for example, hard disk drives or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via a WLAN interface 1529.

Figure 8D:
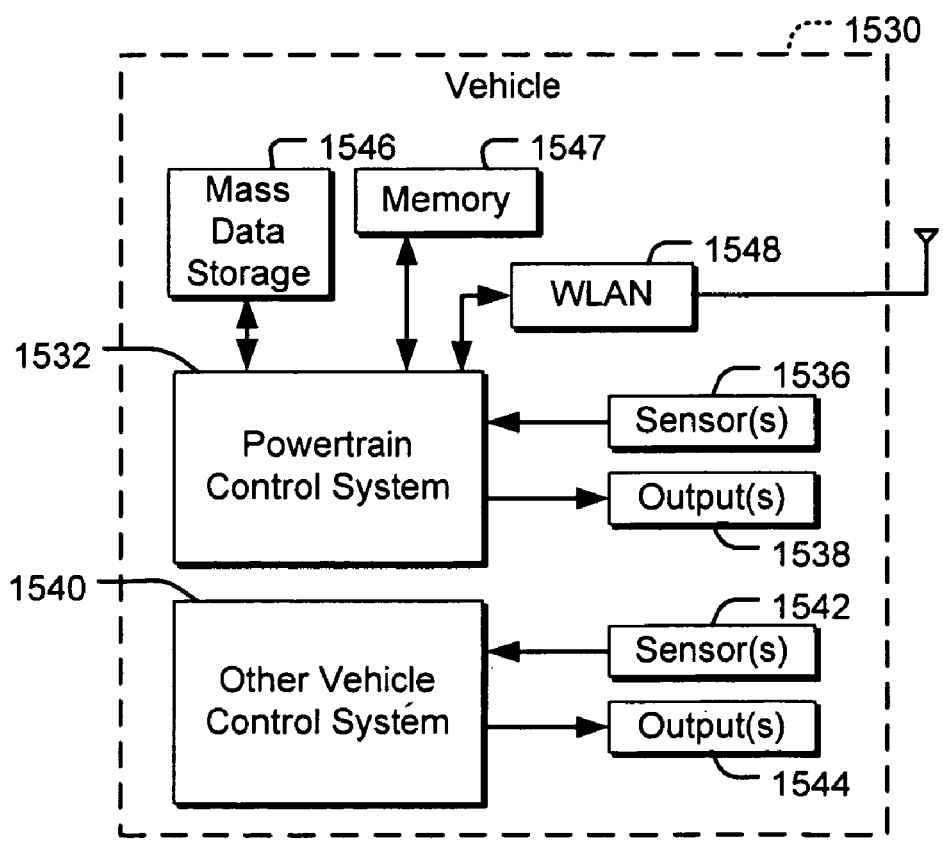
FIG. 8D is a block diagram of an example embodiment in a vehicle control system.

Referring now to FIG. 8D, the present invention may be embodied as a disk drive or a disk drive controller, in a control system of a vehicle 1530, WLAN interface and/or mass data storage of the vehicle 1530. In some implementations, the present invention implements a powertrain control system 1532 that receives inputs from one or more sensors 1536 such as temperature sensors, pressure sensors, rotational sensors, airflow sensors and/or any other suitable sensors and/or that generates one or more output control signals 1538 such as engine operating parameters, transmission operating parameters, braking parameters, and/or other control signals.

The present invention may also be embodied in other control systems 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices, for example, hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via a WLAN interface 1548. The control system 1540 may also include mass data storage, memory and/or a WLAN interface (all not shown).

Figure 8E:
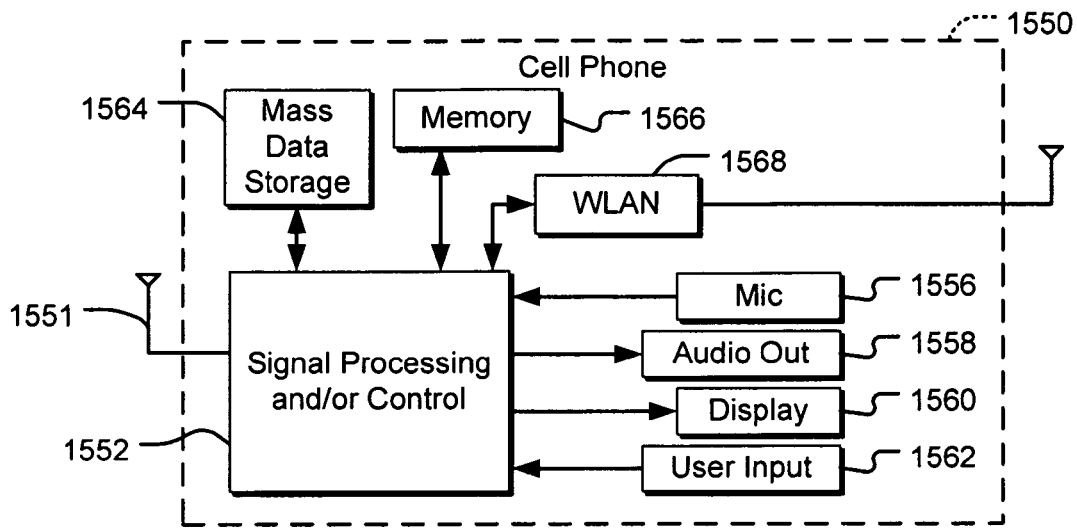
FIG. 8E is a block diagram of an example embodiment in a cellular or mobile phone.

Referring now to FIG. 8E, the present invention may be embodied as a disk drive or a disk drive controller, in a cellular phone 1550 that may include a cellular antenna 1551. The present invention may implement either or both signal processing and/or control circuits, which are generally identified in FIG. 8E at 1552, a WLAN interface and/or mass data storage of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices, for example, hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via a WLAN interface 1568.

Figure 8F:
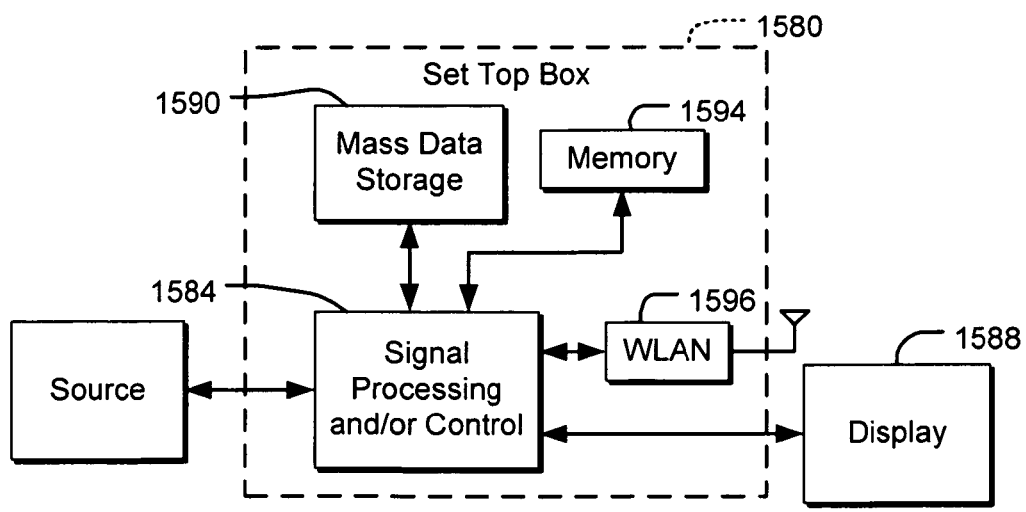
FIG. 8F is a block diagram of an example embodiment in a set-top box.

Referring now to FIG. 8F, the present invention may be embodied as a disk drive or a disk drive controller, in a set top box 1580. The present invention may implement either or both signal processing and/or control circuits, which are generally identified in FIG. 8F at 1584, a WLAN interface and/or mass data storage of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices, for example, hard disk drives and/or DVD drives. At least one HDD may have the configuration shown in FIG. 8A and/or at least one DVD may have the configuration shown in FIG. 8B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via a WLAN network interface 1596.

Figure 8G:
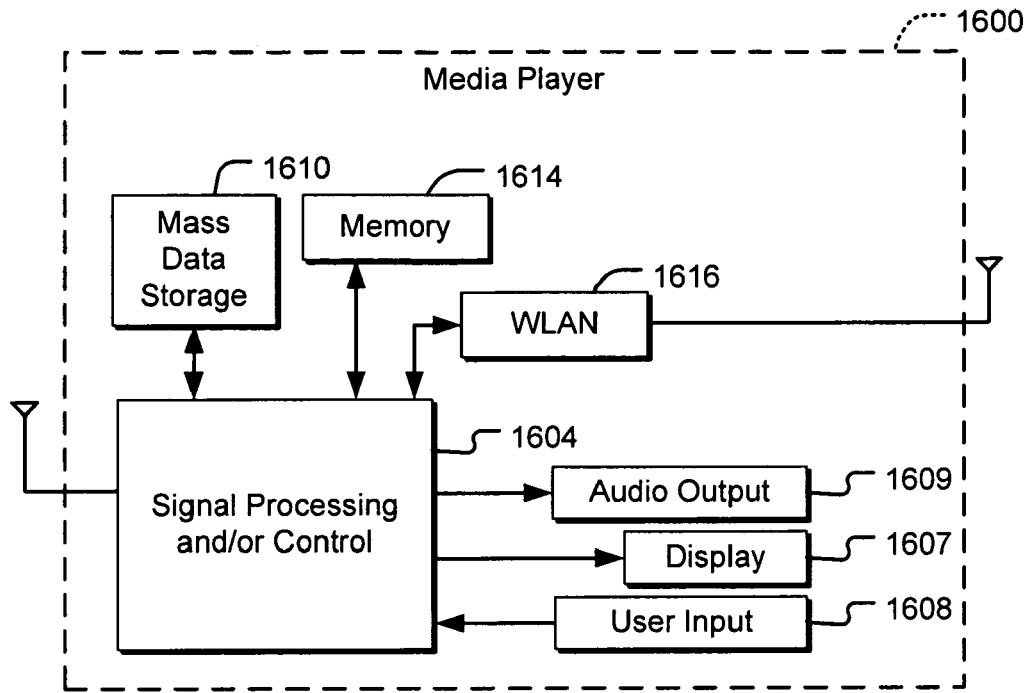
FIG. 8G is a block diagram, of an example embodiment in a media player.

Referring now to FIG. 8G, the present invention may be embodied as a disk drive or a disk drive controller, in a media player 1600. The present invention may implement either or both signal processing and/or control circuits, which are generally identified in FIG. 8G at 1604, a WLAN interface and/or mass data storage of the media player 1600. In some implementations, media player 1600 includes a display 1607 and/or a user input 1608 such as a keypad, touchpad and the like. In some implementations, media player 1600 may employ a graphical user interface (GUI) that typically employs menus, drop down menus, icons and/or a point-and-click interface via display 1607 and/or user input 1608. Media player 1600 further includes an audio output 1609 such as a speaker and/or audio output jack. Signal processing and/or control circuits 1604 and/or other circuits (not shown) of media player 1600 may process data, perform coding and/or encryption, perform calculations, format data and/or perform any other media player function.

Media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices, for example, hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". Media player 1600 may be connected to memory 1614 such as RAM, ROM, low latency nonvolatile memory such as flash memory and/or other suitable electronic data storage. Media player 1600 also may support connections with a WLAN via a WLAN interface 1616. Still other implementations in addition to those described above are contemplated.

Figure 8H:
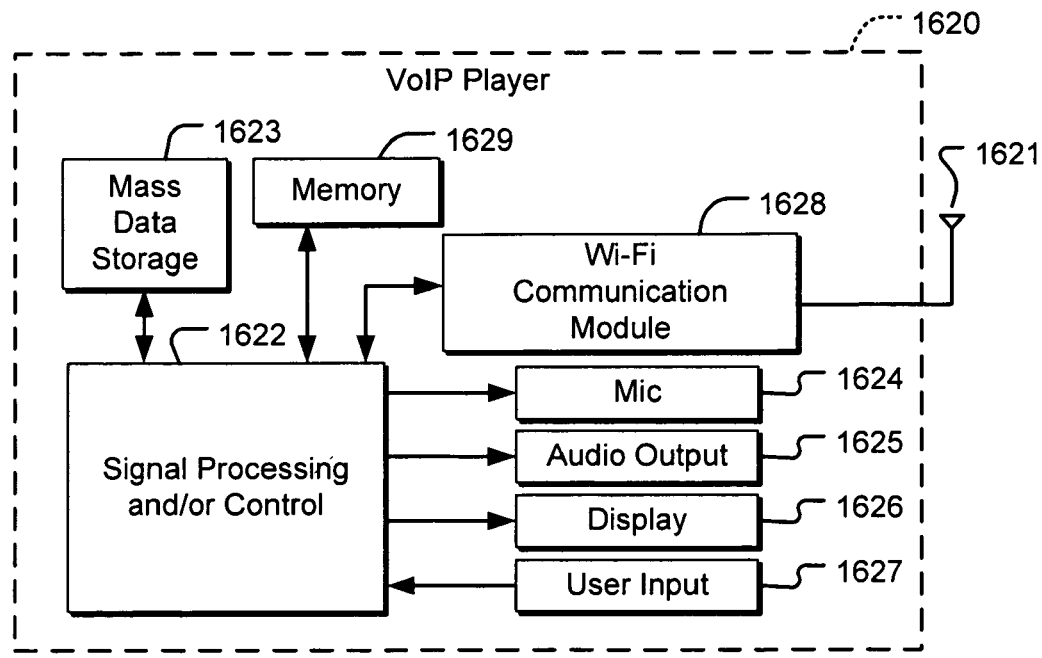
FIG. 8H is a block diagram of an example embodiment in a Voice-over Internet Protocol (VoIP) player.

Referring to FIG. 8H, the present invention may be embodied as a disk drive or a disk drive controller, in a Voice over Internet Protocol (VoIP) player 1620 that may include an antenna 1621. The present invention may implement either or both signal processing and/or control circuits, which are generally identified in FIG. 8H at 1622, a wireless interface and/or mass data storage of the VoIP player 1620. In some implementations, VoIP player 1620 includes, in part, a microphone 1624, an audio output 1625 such as a speaker and/or audio output jack, a display monitor 1626, an input device 1627 such as a keypad, pointing device, voice actuation and/or other input devices, and a Wireless Fidelity (Wi-Fi) communication module 1628. Signal processing and/or control circuits 1622 and/or other circuits (not shown) in VoIP player 1620 may process data, perform coding and/or encryption, perform calculations, format data and/or perform other VoIP player functions.

VoIP player 1620 may communicate with mass data storage 1623 that stores data in a nonvolatile manner such as optical and/or magnetic storage devices, for example, hard disk drives and/or DVD drives. At least one HDD may have the configuration shown in FIG. 8A and/or at least one DVD drive may have the configuration shown in FIG. 8B. The HDD may be a mini HDD that includes one or more platters having a diameter that is smaller than approximately 1.8". VoIP player 1620 may be connected to memory 1629, which may be a RAM, ROM, low latency nonvolatile memory such as flash memory and/or other suitable electronic data storage. VoIP player 1620 is configured to establish communications link with a VoIP network (not shown) via Wi-Fi communication module 1628.

The invention has been described above with respect to particular illustrative embodiments. It is understood that the invention is not limited to the above-described embodiments and that various changes and modifications may be made without departing from the scope of the invention.

What is claimed is:

1. Drive circuitry for a driving a load through a transmission line, the drive circuitry comprising:
   a connection to the transmission line;
   a steady state supply resistor connected in series with a steady state supply switch between a power source and the connection;
   a steady state termination resistor connected in parallel with a steady state termination switch across the connection;
   a boost supply switch connected in series between the power source and the connection; and
   a switch controller configured to close the boost supply switch during a boost period of driving the load, and thereafter to open the boost supply switch during a steady state period of driving the load, wherein during the steady state period, the steady state supply switch and the steady state termination switch are both controlled to be closed.

2. Drive circuitry according to claim 1, wherein a resistance value of the steady state supply resistor determines a targeted steady state current delivered to the load during the steady state period.

3. Drive circuitry according to claim 2, wherein a resistance value of the steady state termination resistor together with the resistance value of the steady state supply resistor, provides an impedance match to that of the transmission line during the steady state period.

4. Drive circuitry according to claim 1, wherein during the boost period, the switch controller is configured to close the steady state supply switch and to open the steady state termination switch.

5. Drive circuitry according to claim 1, further comprising:
   a boost supply resistor connected in series with the boost supply switch; and
   a boost termination resistor connected in parallel with a boost termination switch across the connection;
   wherein the switch controller is configured to close the boost supply switch and the boost termination switch during the boost period.

6. Drive circuitry according to claim 5, wherein the boost termination switch is closed during the steady state period.

7. Drive circuitry according to claim 6, wherein the boost termination switch is hard-wired to a closed position.

8. A hard disk drive comprising:
a rotatable magnetic medium;
a read/write head to read and write magnetic information to a surface of the rotatable magnetic medium, wherein the read/write head is supported for scanning movement across the surface of the magnetic recording medium;
a controller to generate an information signal based on information to be written to the magnetic recording medium, the controller further to control the scanning movement of the read/write head;
drive circuitry to differentially drive the read/write head through a differential pair of transmission lines, the differential pair of transmission lines being connected to the drive circuitry through corresponding first and second connections in accordance with the information signal;
wherein the drive circuitry comprises positive-going drive circuitry, negative-going drive circuitry and termination circuitry, which comprises:
a first steady state supply resistor connected in series with a first steady state supply switch between a positive power source and the first connection;
a first steady state termination resistor connected in parallel with a first steady state termination switch across the first connection;
a first boost supply switch connected in series between the positive power source and the first connection;
a second steady state supply resistor connected in series with a second steady state supply switch between a negative power source and the second connection;
a second steady state termination resistor connected in parallel with a second steady state termination switch across the second connection;
a second boost supply switch connected in series between the negative power source and the second connection;
a third steady state supply resistor connected in series with a third steady state supply switch between the negative power source and the first connection;
a third boost supply switch connected in series between the negative power source and the first connection; and
a fourth steady state supply resistor connected in series with a fourth steady state supply switch between the positive power source and the second connection;
a fourth boost supply switch connected in series between the positive power source and the second connection;
wherein the controller includes a switch controller configured to operate in a positive-going current supply mode and a negative-going current supply mode;
wherein in the positive-going current supply mode, the third and fourth boost supply switches and the third and fourth steady state supply switches are all controlled to be open, the first and second boost supply switches are controlled to be closed during a boosted period of driving the load, and thereafter the first and second boost supply switches are controlled to be opened during a steady state period of driving the load, wherein during the steady state period, the first and second steady state supply switches and the first and second steady state termination switches are all controlled to be closed; and
wherein in the negative-going current supply mode, the first and second boost supply switches and the first and second steady state supply switches are all controlled to be open, the third and fourth boost supply switches are controlled to be closed during a boosted period of driving the load, and thereafter the third and fourth boost supply switches are controlled to be opened during a steady state period of driving the load, wherein during the steady state period, the third and fourth steady state supply switches and the first and second steady state termination switches are all controlled to be closed.

9. A hard disk drive according to claim 8, wherein resistance values of the first, second, third and fourth steady state supply resistors respectively determine a targeted steady state current delivered to the load during the steady state period.

10. A hard disk drive according to claim 9, wherein resistance values of the first and second steady state termination resistors respectively, together with the resistance values of the first, second, third and fourth steady state supply resistors, provide an impedance match to that of the differential pair of transmission lines during the steady state period.

11. A hard disk drive according to claim 8, wherein during the positive-going current supply mode, the switch controller is configured to close the first and second steady state switches and to open the first and second steady state termination switches.

12. A hard disk drive according to claim 8, further comprising:
first, second, third and fourth boost supply resistors respectively connected in series with the first, second, third and fourth boost supply switches; and
first and second boost termination resistors respectively connected in parallel with first and second boost termination switches across the first and second connections;
wherein the switch controller is configured to close the first and second boost supply switches and the first and second boost termination switches during the positive-going current supply mode.

13. A hard disk drive according to claim 12, wherein the first and second boost termination switches are closed during the positive-going steady state period.

14. A hard disk drive according to claim 13, wherein the first and second boost termination switches are hard-wired to a closed position.

15. A method for operating drive circuitry which drives a load through a transmission line, the drive circuitry comprising a connection to the transmission line and a steady state supply resistor connected in series with a steady state supply switch between a power source and the connection, the method comprising:
closing a boost supply switch during a boost period of driving the load; and
thereafter opening the boost supply switch during a steady state period of driving the load;
wherein during the steady state period, the steady state supply switch and a steady state termination switch are both closed.

16. A method for operating drive circuitry according to claim 15, comprising delivery of a targeted steady state current to the load during the steady state period, wherein the targeted steady state current is determined by a resistance value of the steady state supply resistor.

17. A method for operating drive circuitry according to claim 16, comprising matching of an impedance of the drive circuitry match to that of the transmission line during the steady state period, wherein the impedance match is provided by a resistance value of the steady state termination resistor together with the resistance value of the steady state supply resistor.

18. A method for operating drive circuitry according to claim 15, further comprising closing the steady state supply switch and opening the steady state termination switch during the boost period.

19. A method for operating drive circuitry according to claim 15, wherein the drive circuitry further comprises a boost supply resistor connected in series with the boost supply switch and a boost termination resistor connected in parallel with a boost termination switch across the connection,
    wherein the method further comprises closing the boost supply switch and the boost termination switch during the boost period.

20. A method for operating drive circuitry according to claim 19, further comprising closing the boost termination switch during the steady state period.

21. A method for operating drive circuitry according to claim 20, further comprising hard-wiring of the boost termination switch to a closed position.

* * * * *